United States Patent [19]

Ronne

[11] 3,995,876
[45] Dec. 7, 1976

[54] TRAILER DOLLY

[76] Inventor: R. Mack Ronne, 1244 E. River Forest Lane, Portland, Oreg. 97222

[22] Filed: June 25, 1975

[21] Appl. No.: 590,308

[52] U.S. Cl. .......................... 280/423 A; 214/86 A; 280/472

[51] Int. Cl.² .......................................... B60D 3/00

[58] Field of Search ....... 280/423 A, 476 R, 476 A, 280/408, 400, 402, 472, 473, 456 R, 467, 505; 214/86 A

[56] References Cited

UNITED STATES PATENTS

| | | | |
|---|---|---|---|
| 2,515,705 | 7/1950 | Gardiner | 280/476 R |
| 2,733,931 | 2/1956 | Reid et al. | 280/423 A |
| 2,782,054 | 2/1957 | Nelson | 280/479 R |
| 3,254,900 | 6/1966 | Allen | 280/479 A |
| 3,421,777 | 1/1969 | Barker et al. | 280/423 A |
| 3,554,578 | 1/1971 | Reed | 280/490 R |
| 3,767,069 | 10/1973 | White et al. | 214/86 A |

FOREIGN PATENTS OR APPLICATIONS

| | | | |
|---|---|---|---|
| 303,942 | 9/1968 | Switzerland | 280/423 A |

Primary Examiner—M. H. Wood, Jr.
Assistant Examiner—David M. Mitchell
Attorney, Agent, or Firm—Eugene M. Eckelman

[57] ABSTRACT

A longitudinal frame has a conventional fifth wheel on its forward end and this end of the frame is supported on caster wheels. The rearward end of the frame has a depending portion provided with hitches on each side for connection to two hitch points on the front of a towing vehicle to form a longitudinally rigid extension of the towing vehicle. With this arrangement the operator faces the dolly. The hitches on the dolly are vertically adjustable to provide easy connection to the towing vehicle and to accommodate various ground conditions during connection. The fifth wheel assembly of the dolly is supported on an auxiliary longitudinally extending frame pivotally connected at a rearward point on the main frame, and an air lift bag assembly is provided between the auxiliary frame and the main frame for raising and lowering the fifth wheel assembly. A vertically adjustable pony wheel is provided at the rear of the main frame.

3 Claims, 5 Drawing Figures

TRAILER DOLLY

BACKGROUND OF THE INVENTION

This invention relates to new and useful improvements in dolly constructions and is particularly concerned with a dolly arranged for connection to a towing vehicle for maneuvering trailers in yard areas or the like.

Devices have heretofore been proposed for maneuvering trailers in yard areas or the like in order that a road tractor can be in service while the trailer is being loaded or unloaded. Such dollies employ a fifth wheel for engagement with the king pin of a trailer and thus in operation are pivotally connected to a towing vehicle for maneuvering in the same manner as the usual tractor and trailer arrangement. In addition, the trailer to be maneuvered is in turn connected to the dolly, which vehicle assembly, in view of the double pivot connection, namely, one at the towing vehicle and one at the dolly, is very difficult to maneuver. Also, the principal portion of maneuvering in the yard is done by reverse movement of the towing vehicle, and the prior devices thus require a skilled operator. The prior dollies also have the disadvantage that they are difficult to attach to and detach from trailers since the trailer must be raised and lowered in order to be connected to or disconnected from said dollies. Inconvenience also exists in the prior dollies for attaching them to or detaching them from a towing vehicle.

SUMMARY OF THE INVENTION

According to the present invention, a trailer dolly is provided that has substantial improvements over prior art devices first in its structural arrangement providing for hitching in a longitudinal rigid connection to a towing vehicle so as to provide improved maneuvering capabilities by the towing vehicle, the connection of the dolly being to the front end of the towing vehicle so that the operator faces the dolly and does the principal portion of the maneuvering while moving forwardly.

Another object is to provide a trailer dolly of the type described wherein said dolly when hooked to a towing vehicle is angled slightly to one side to allow the operator of the towing vehicle to have an improved line of sight down one side of the trailer being maneuvered.

Another object of the invention is to provide a trailer dolly having adjustment means at its rearward end facilitating easy and rapid connection to a towing vehicle and also to provide lift means for a fifth wheel connecting assembly so as to facilitate moving into and out of connecting engagement with trailers. Still another object is to provide a trailer dolly of the type described utilizing caster wheels as its support wheels to facilitate easy maneuvering of the dolly.

The invention will be better understood and additional objects and advantages will become apparent from the following description taken in connection with the accompanying drawings.

DETAILED DESCRIPTION OF A PREFERRED EMBODIMENT

Figure 1:
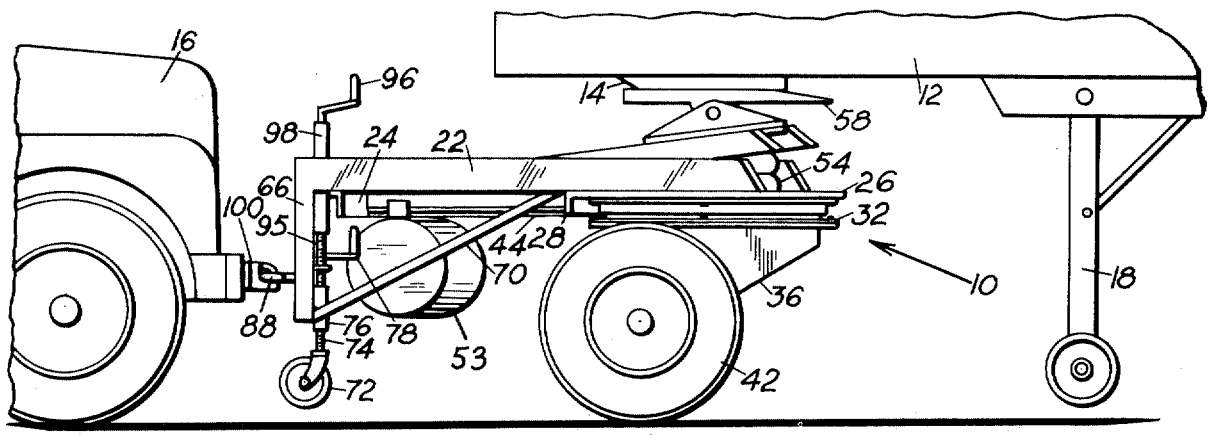
FIG. 1 is a side elevational view of a trailer dolly embodying the present invention, the dolly being shown in use as connected to a towing vehicle and a trailer.

The present dolly is designated generally by the numeral 10 and is illustrated in FIG. 1 in a use position thereof wherein a trailer 12 having a king pin assembly 14 is connected to the dolly for maneuvering to and from a loading area or the like by a towing vehicle 16. The trailer has the conventional pony wheels 18 rearward of the forward end for supporting such forward end when the trailer is standing on its own.

Figure 3:
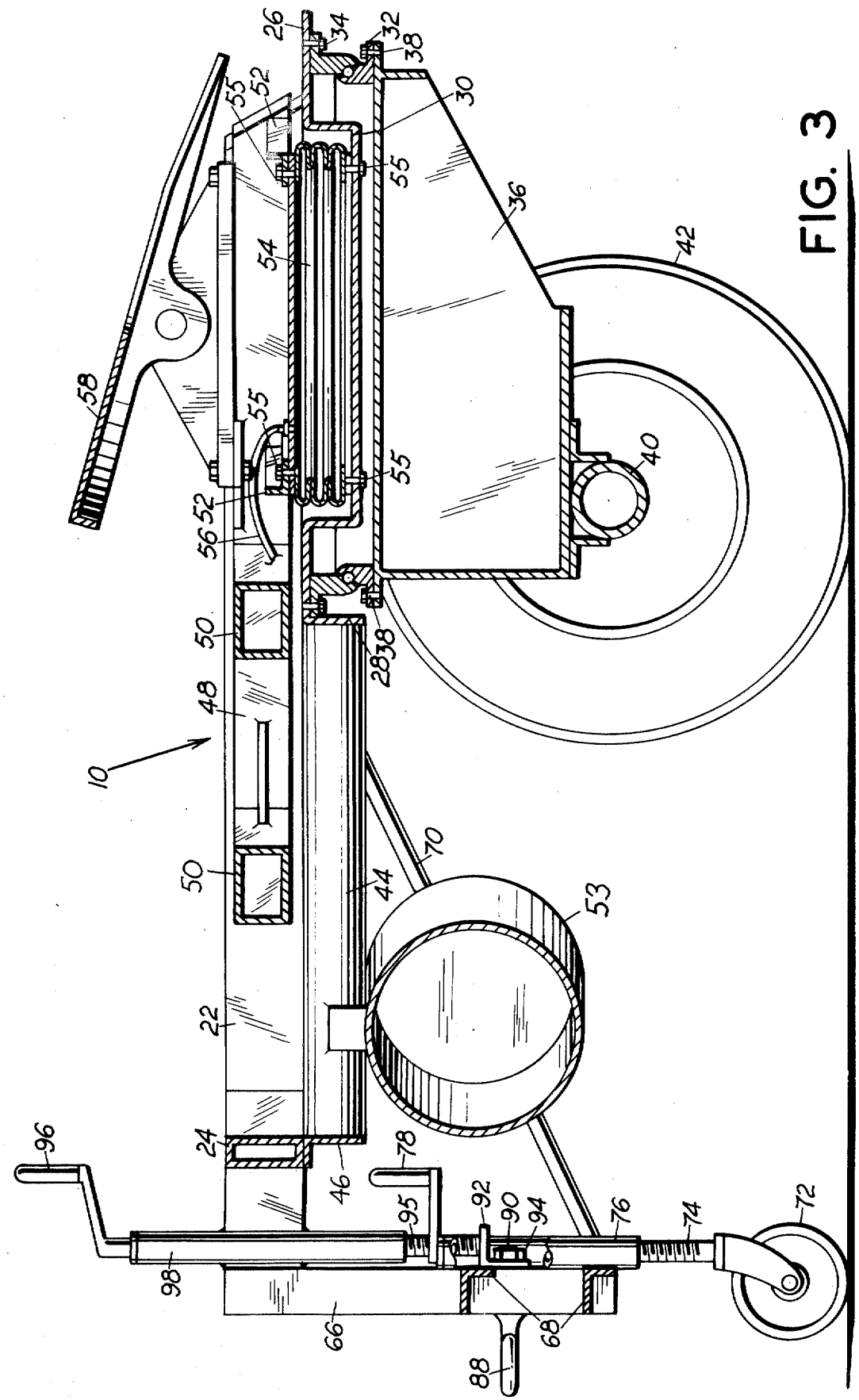
FIG. 3 is an enlarged longitudinal sectional view taken on the line 3—3 of FIG. 2.

The dolly 10 comprises a pair of longitudinal side frame members 22 interconnected by a rear cross frame member 24 and other structure at the rearward end thereof to be described. A front plate 26 is secured integrally to the underside of the frame members 22, and this plate has a rear depending cross flange 28 and also has a top opening well portion 30 intermediate its forward and rearward ends. A conventional slewing ring assembly 32, FIG. 3, is secured to the underside of plate 26, as by screws 34, and this slewing ring is connected to a depending box-like frame 36, as by screws 38. An axle 40 is secured to the frame 36 at one end of the latter, and this axle has two wheels 42, one at opposite ends thereof. The axle 40, being secured to the frame closer to one end than the other provides a castering steering effect.

A torsion bar 44 extends integrally between the depending flange 28 and a rearward depending flange 46 on rear cross frame member 24 for torsional reinforcement.

A pair of longitudinal auxiliary frame members 48 are disposed between the frame members 22, and such frame members 48 are interconnected by cross frame members 50 and a pair of laterally extending angle iron frame members 52 disposed over the well 30. An elevating air bag assembly 54 is secured at its lower end to the bottom of the well 30 and at its upper end to the angle irons 52, as by screws 55. Suitable conduit means 56 communicate between the air bag assembly 54 and power supply means for operation of the air bag assembly. The power supply, which comprises a compressed air system and controls therefor, exists on the towing vehicle 16 and since such is conventional structure, it is not detailed herein. It is desired, however, that a reserve tank 53 be carried on the dolly to which the conduit 56 is connected to provide instant actuation of the air bag assembly. The auxiliary frame members 48 have integral lugs 57 which support a fifth wheel assembly 58 at the forward portion of the dolly for connection to the king pin assembly 14 of a trailer in a well known manner. The rearward ends of the auxiliary frame members 48 have laterally extending stub shafts 60 supported in journals 62 secured on the side frames 22 whereby upon operation of the air bag assembly the auxiliary frame can be raised or lowered to position the fifth wheel assembly 58 vertically as desired for connecting and disconnecting such assembly to a trailer.

Figure 2:
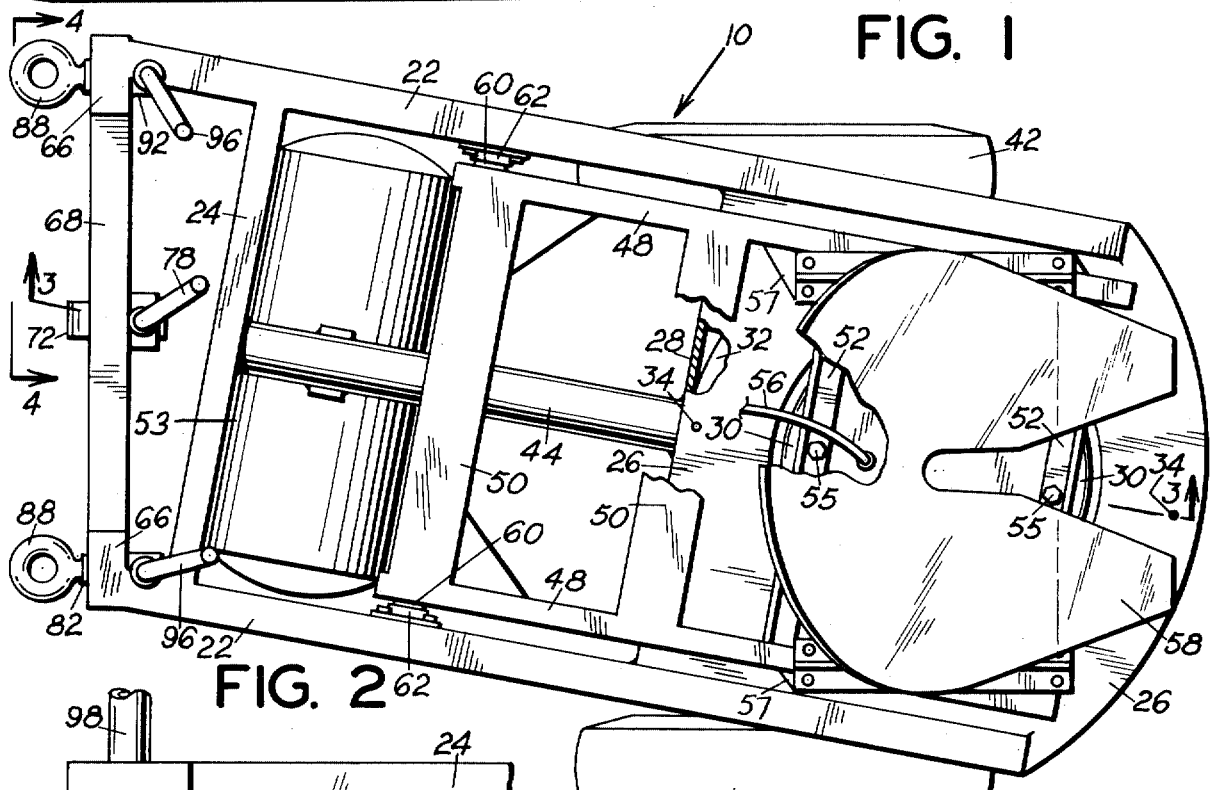
FIG. 2 is a top plan view of the dolly apart from a towing vehicle and trailer.

The rearward ends of the side frame members 22 have depending right angle integral extensions 66 interconnected laterally at their lower end by a pair of cross frame members 68. These extensions are reinforced longitudinally by angle braces 70, FIG. 1. As best seen in FIG. 2, one of the side frame members 22 is longer than the other whereby the front cross frames of the dolly are somewhat diagonal to the longitudinal center line of the dolly. The purpose of such structure will be more apparent hereinafter.

The rear of the dolly has a caster pony wheel 72 with an upwardly extending threaded shank 74 threadedly engaged in an upright tubular member 76 secured to the cross frames 68 centrally of the dolly. Threaded shank 74 projects from the upper end of member 76 and has a crank handle 78 thereon whereby upon rotation of the handle, the shaft 76 can be extended or retracted to vary the supported elevation of the rearward end of the dolly.

Figure 4:
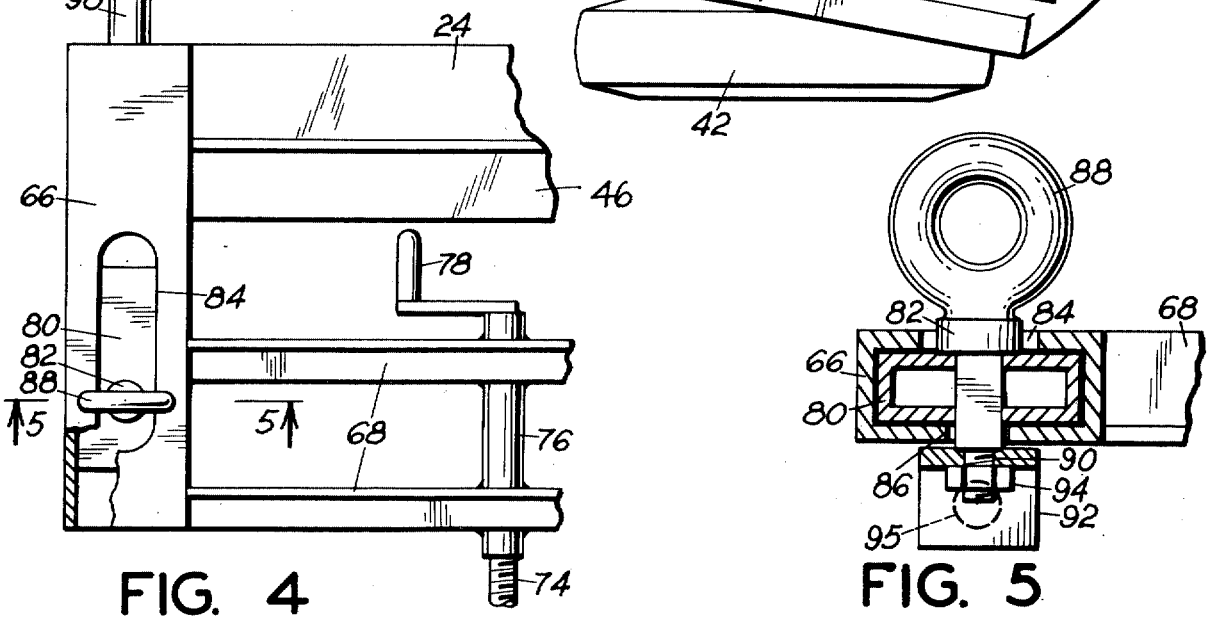
FIG. 4 is a fragmentary elevational view, partly broken away and taken on the line 4—4 of FIG. 2.
Figure 5:
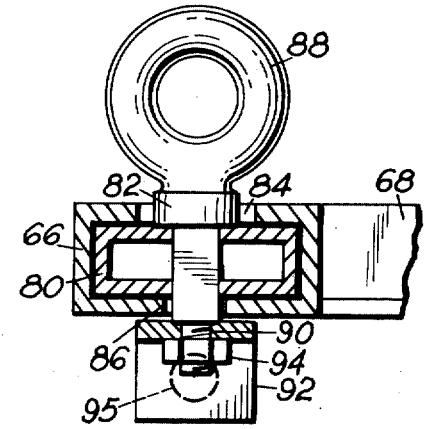
FIG. 5 is an enlarged fragmentary sectional view taken on the line 5—5 of FIG. 4.

Each of the depending extensions 66 at the rear of the dolly comprises a hollow box-like member, best seen in FIG. 5, and slide members 80, also seen in FIG. 4, are confined slidably therein. Each of these slide members is integral with a hitch element 82 projecting at its rearward end through a vertically elongated slot 84 in the rear wall of the extension 66 and projecting at its forward end through a vertically elongated slot 86 on the front wall of the extension 66. The rearward end of the hitch element 82 has an eye 88 and the forward end of such hitch element has a threaded extension 90 secured to a right angle bracket 92 by a nut 94 engageable with the threaded extension 90. A threaded shank 95 terminating at its upper end in a handle 96 is threadedly engaged in an upright tubular member 98 disposed above each hitch element 82. Members 98 are secured integrally to frame members 22 and the lower ends of the threaded shanks 95 have a rotatable connection with their respective brackets 92, whereby upon rotation of the shanks 95 by means of handles 96, the respective hitches 82 can be raised and lowered for convenient connection to the towing vehicle 16.

For the purpose of the invention, the towing vehicle is provided with hitch elements 100, FIG. 1, at its forward end which have releasable engagement with the eyes 88, Such hitch elements may be attached to the vehicle in any well known manner.

In the operation of the present dolly, it is hitched to a towing vehicle 16 in the manner described and the operator can readily maneuver the dolly into and out of engagement with trailers 12 for moving them into and away from loading docks or otherwise. Attachment of the fifth wheel assembly to and detachment from the trailer is readily accomplished by suitable operation of the air bag assembly 54 to raise and lower the fifth wheel assembly 58 as needed, and this may be accomplished without any manipulation of the pony wheels on the trailer. The two point hitch connection to the dolly to the towing vehicle provides a longitudinally rigid connection of the dolly to said vehicle and the dolly can thus be conveniently operated as necessary to connect it to a trailer and for maneuvering the trailer.

The rear to front connection of the dolly to the towing vehicle, respectively, allows the operator to face his maneuvering operation most of the time. This provides an easier method of maneuvering a trailer than when backing up. In addition, the one hitch member 88 is disposed rearwardly of the other and thus the dolly will be angled relative to the towing vehicle so that the operator can have clear vision down one side of the trailer. Assuming that the operator is seated on the left side of the towing vehicle, the longer frame is on said left side so that the dolly will be angled away or to the right to provide a line of sight down the left side of the trailer.

Pony wheel 72 may be utilized in the event that it is desired to disconnect the dolly from the vehicle 16. After connection of the dolly to the vehicle, such pony wheel assembly is raised to be in an out of the way position. The hitch members 82 are readily connected to the towing vehicle by individual vertical adjustment thereof if necessary.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A trailer dolly comprising
   a. a longitudinal main frame having forward and rearward ends,
   b. a conventional fifth wheel on a forward end of said main frame arranged for removable connection to the king pin of a trailer,
   c. a caster wheel assembly under the forward end of said main frame providing steerable wheel support of said dolly and a trailer when connected to said fifth wheel,
   d. and hitch means at the rearward end of said frame arranged to connect said dolly to a towing vehicle,
   e. said hitch means comprising a pair of hitch members located one on each side of said main frame for connection to a towing vehicle at two lateral points whereby said dolly when connected to a towing vehicle comprises a longitudinally rigid extension of the towing vehicle.

2. The trailer dolly of claim 1 wherein one of said hitch members is disposed longitudinally rearward of the other to cause said main frame to be angled relative to the towing vehicle.

3. A trailer dolly in combination with a towing vehicle comprising
   a. a longitudinal main frame on said dolly having forward and rearward ends;
   b. a conventional fifth wheel on the forward end of said main frame arranged for removable connection to the king pin of a trailer,
   c. a caster wheel assembly under the forward end of said main frame providing steerable wheel support for said dolly and a trailer when connected to said fifth wheel,
   d. hitch means at the rearward end of said frame,
   e. and hitch means on the front of said towing vehicle arranged for removable connection to said hitch means on said dolly,
   f. said hitch means on said main frame and on said towing vehicle comprising a pair of hitch members located one on each side of said main frame and corresponding hitch members on said towing vehicle whereby said dolly when connected to said towing vehicle comprises a longitudinally rigid extension of said towing vehicle.

* * * * *